US009185528B2

(12) United States Patent
Schwartz et al.

(10) Patent No.: US 9,185,528 B2
(45) Date of Patent: Nov. 10, 2015

(54) WIFI MAPPING AND MOTION DETECTION

(75) Inventors: Steven A. Schwartz, Melbourne Beach, FL (US); Bruce F. Queen, Arlington, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 13/536,450

(22) Filed: Jun. 28, 2012

(65) Prior Publication Data

US 2014/0004874 A1    Jan. 2, 2014

(51) Int. Cl.
*H04W 24/00* (2009.01)
*H04W 4/04* (2009.01)
*G01S 5/02* (2010.01)
*G01S 1/08* (2006.01)
*G01S 1/68* (2006.01)
*G01S 13/87* (2006.01)

(52) U.S. Cl.
CPC ............... *H04W 4/043* (2013.01); *G01S 1/08* (2013.01); *G01S 1/68* (2013.01); *G01S 5/02* (2013.01); *G01S 5/0226* (2013.01); *G01S 13/878* (2013.01)

(58) Field of Classification Search
CPC ........................................................ H04W 4/04
USPC ........................................................ 455/456.1
See application file for complete search history.

(56) References Cited

U.S. PATENT DOCUMENTS

| | | | |
|---|---|---|---|
| 6,307,475 B1 * | 10/2001 | Kelley | 340/573.1 |
| 6,459,758 B1 * | 10/2002 | Lee et al. | 378/22 |
| 7,088,236 B2 | 8/2006 | Sorensen | |
| 7,099,676 B2 | 8/2006 | Law et al. | |
| 7,379,744 B2 | 5/2008 | Tamaki et al. | |
| 2003/0146835 A1 * | 8/2003 | Carter | 340/539.13 |
| 2003/0210143 A1 * | 11/2003 | Haddad | 340/539.13 |
| 2005/0055568 A1 | 3/2005 | Argawala et al. | |
| 2005/0130677 A1 | 6/2005 | Meunier et al. | |
| 2005/0227707 A1 * | 10/2005 | Law et al. | 455/456.1 |
| 2008/0079572 A1 | 4/2008 | Tsaba et al. | |
| 2008/0318547 A1 * | 12/2008 | Ballou et al. | 455/410 |
| 2009/0102711 A1 * | 4/2009 | Elwell et al. | 342/357.06 |
| 2009/0286548 A1 * | 11/2009 | Coronel et al. | 455/456.1 |
| 2010/0060509 A1 | 3/2010 | Chambers et al. | |

(Continued)

OTHER PUBLICATIONS

Krumm, John, et al., Locadio: Inferring Motion and Location from Wi-Fi Signal Strengths, Proceedings of Mobiquitous 2004, First Annual International Conference on Mobiel and Ubiquitous Systems: Networking and Services, Aug. 22-26, 2004, pp. 4-14, Boston, MA, USA.

Saha, Siddhartha, et al., Location Determination of a Mobile Device using IEEE 802.11b Access Point Signals, Wireless Communications and Networking, 2003, IEEE, vol. 3, pp. 1987-1992.

LaMarca, Anthony, et al., Self-Mapping in 802.11 Location Systems, Proceedings of the Seventh International Conference on Ubiquitous Computing, Lecture Notes in Computer Science, 2005.

(Continued)

*Primary Examiner* — Timothy Pham
(74) *Attorney, Agent, or Firm* — Robert P. Lenart, Esq.; Pietragallo Gordon Alfano Bosick & Raspanti, LLP

(57) ABSTRACT

An apparatus includes a plurality of transceivers positioned to transmit and/or receive signals that pass through at least a portion of a structure of interest, wherein each of the transceivers receives a signal from at least one of the other transceivers, and a processor using the strength of the received signals, the locations of the transceivers, prior knowledge of building practices, and exterior characteristics of the structure to produce a map of the structure of interest and/or to detect movement of persons in the structure of interest. A method of producing a map of the structure of interest and/or detecting the movement of persons in the structure of interest is also provided.

17 Claims, 5 Drawing Sheets

(56) References Cited

U.S. PATENT DOCUMENTS

| | | | |
|---|---|---|---|
| 2011/0210843 A1* | 9/2011 | Kummetz | 340/517 |
| 2011/0273321 A1* | 11/2011 | Joshi et al. | 342/27 |
| 2012/0146788 A1 | 6/2012 | Wilson et al. | |
| 2012/0214511 A1* | 8/2012 | Vartanian et al. | 455/456.1 |
| 2012/0310529 A1* | 12/2012 | Hamilton et al. | 701/433 |
| 2014/0045518 A1* | 2/2014 | Sathyan et al. | 455/456.1 |

OTHER PUBLICATIONS

Chan, Li-Wei, et al., Collaborative Localization: Enhancing WiFi-Based Position Estimation with Neighborhood Links in Clusters, Pervasive Computing, Lecture Notes in Computer Science, 2006, vol. 3968, pp. 50-66.

Denis, Tim et al., Real Time Location System using WiFi, Hogeschool, Antwerpen, 2006, pp. 1-8.

* cited by examiner

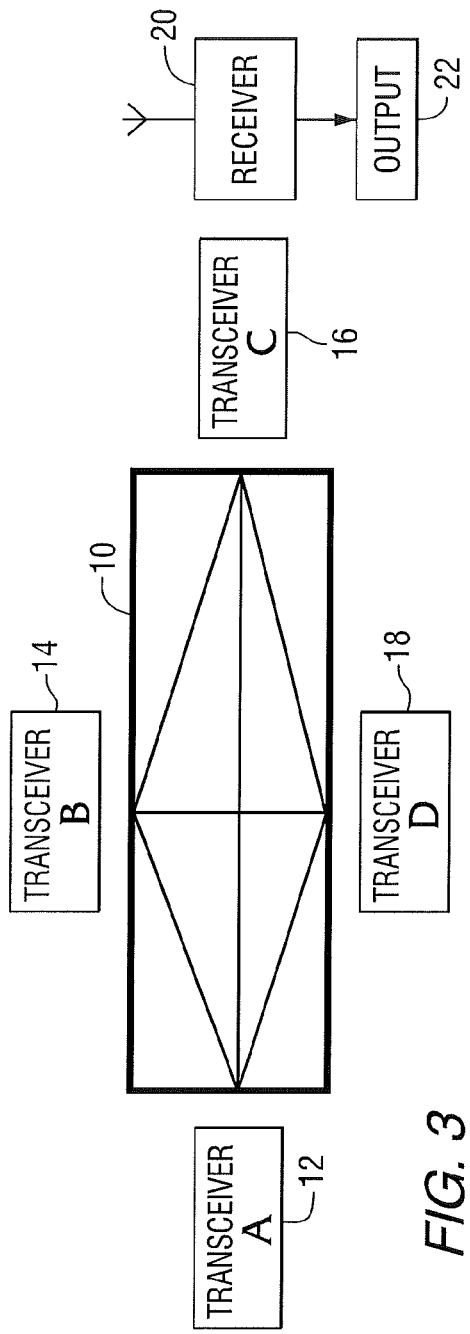
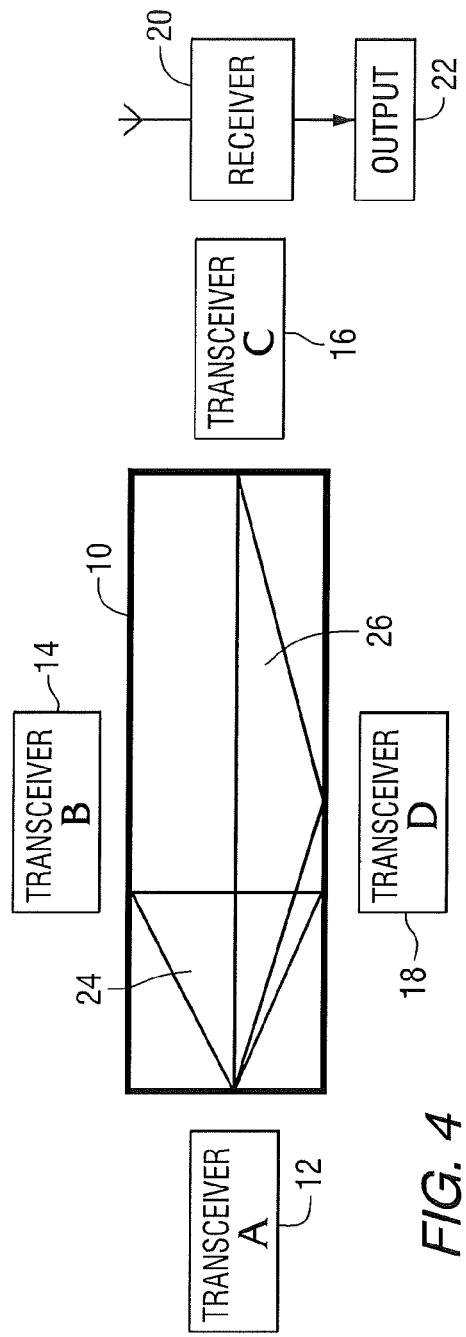
FIG. 3
FIG. 4

WIFI MAPPING AND MOTION DETECTION

FIELD OF THE INVENTION

This invention relates to a method and apparatus for mapping a structure and detecting the movement of objects in the structure.

BACKGROUND OF THE INVENTION

Military personnel, law enforcement personnel, and first responders encounter a variety of dangerous situations on a regular basis. One specific dangerous situation involves the need to enter a building or structure, without knowing any details about the interior. The safety of the responders and the probability of success of the mission is improved if information about the interior space and its contents is known before entry.

Previous attempts to provide this capability are relatively imprecise. One example is the RadarScope, which is a 2.4 GHz handheld radar device that can detect movement of a person in the next room through up to 12 inches of concrete, but does not provide information about where in the room the person is.

It is especially desirable to have a method and apparatus for mapping the interior of a building and detecting the movement of its occupants that can be economically implemented so that it may be adopted by as many first responders as possible.

SUMMARY

In one aspect, the invention provides an apparatus including a plurality of transceivers positioned to transmit and/or receive signals that pass through at least a portion of a structure of interest, wherein each of the transceivers receives a signal from at least one of the other transceivers, and using the strength of the received signals, the locations of the transceivers and prior knowledge of building practices and exterior characteristics of the structure to produce a map of the structure of interest and/or to determine the locations of persons as they move within the structure of interest. The map may be produced using a processor or by overlaying information in a visual display. The location and/or movement of persons in the structure of interest can be determined from the temporal order of fluctuations in the received signal strength.

In another aspect, the invention provides a method of producing a map of a structure of interest and/or detecting movement of persons in the structure of interest.

BRIEF DESCRIPTION OF THE DRAWINGS

FIGS. 1 through 6 are schematic representations of systems that can be used to implement embodiments of the invention.

DETAILED DESCRIPTION OF THE INVENTION

Figure 1:
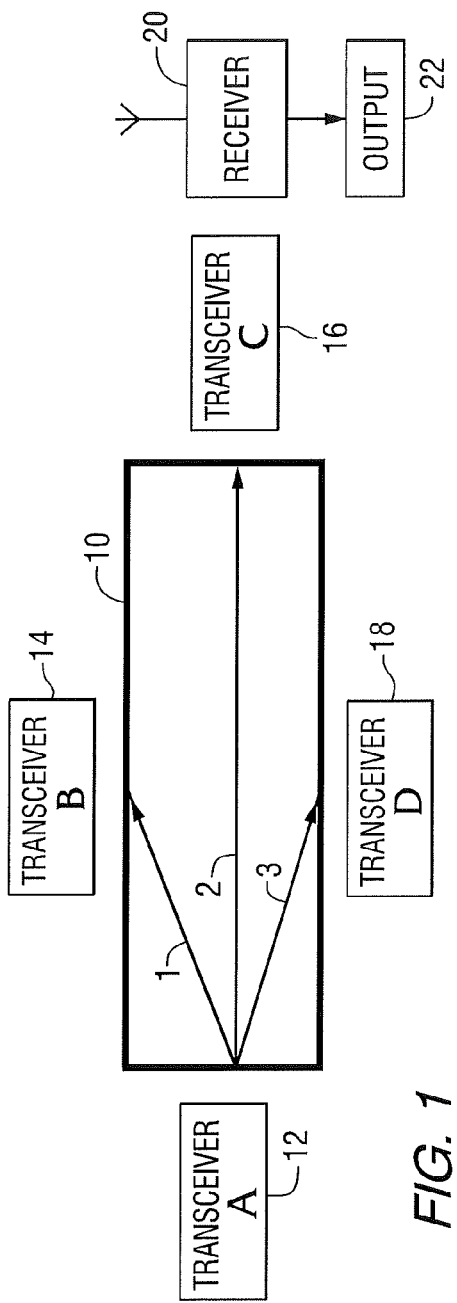

In one aspect, this invention provides an apparatus for producing a crude map of a room or other structure of interest. The invention can be implemented using entirely commercial off-the-shelf (COTS) components with only programming changes. In one embodiment, WiFi signals are exploited to map the interior of the building (i.e., WiFi mapping). WiFi equipment is advantageous because it is especially inexpensive and already certified regarding radiation and health concerns For WiFi mapping, interior maps of a building may be produced using a set of WiFi transmitters and receivers and a processing method such as tomographic backprojection. FIG. 1 is a schematic representation of a simple rectangular building or other structure of interest 10 with WiFi transmitter/receiver modules 12, 14, 16 and 18 (also referred to as transceivers) located at positions A, B, C and D outside the building walls. While FIG. 1 shows four transceivers for the purposes of illustration, it will be understood that many more transceivers can be used. In addition, while the transceivers are shown to be outside of the structure of interest in this embodiment, more generally, the transceivers can be positioned anywhere such that they transmit and/or receive signals that pass through at least a portion of the structure of interest.

To begin the mapping process transceiver 12 transmits a signal, and the WiFi receivers outside the building at locations B, C and D report: (1) whether or not they can receive the signal from the WiFi transmitter at location A; and (2) if the signal is received, the strength of the received signal. This information can be reported (e.g. transmitted) to a receiver 20 that may include a processor for processing the information to produce a map of the building interior as an output 22. The processor can be programmed to use a known mapping technique such as tomographic backprojection. Alternatively, the information could be otherwise transmitted to a remote processor, for example over the Internet, and the remote processor produces the map.

In this example WiFi transceivers are placed around a simple one-room residence. First the transmitter at location A is turned on. Then the receivers at locations B, C, and D report whether or not they receive (and with what strength) the WiFi signal transmitted by the transmitter at location A. The signal paths from transmitter 12 to receivers 14, 16 and 18 are labeled as paths 1, 2 and 3 respectively. Next the transmitter at location A is turned off and the transmitter at location B is turned on. Then the receivers at locations C and D (and optionally A) report back whether they received the signal from the transmitter at location B.

Figure 2:
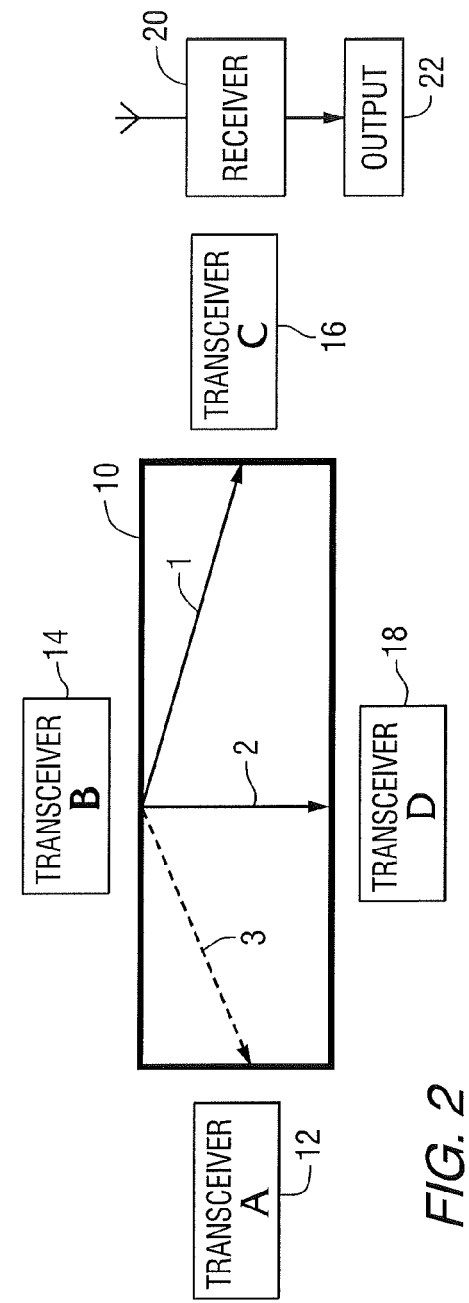

FIG. 2 illustrates a condition in which the transmitter at location B transmits a WiFi signal and the receivers outside of the building at locations C and D report whether or not they can receive the WiFi signal transmitted by the transmitter at location B and indicate the strength of the received signal. Signals duplicating a path in the reverse direction (for example from the transmitter at location B to the receiver at location A along path 3), are redundant, but are still useful to refine the measurements.

This process is repeated by transmitting signals from the transmitters at locations C and D. The process ultimately produces information about all possible paths between the nodes as illustrated in FIG. 3.

In an empty room, such as the ones shown in the FIGS. 1, 2 and 3, one might consider that the received signals all have the nearly same magnitude. This is not usually the case in real life because of non-uniformities within the walls (e.g., studs, beams etc.) and the electromagnetic-wave phase relationships between reflected signals within the structure.

Furthermore, these signals will not be like "laser beams" as portrayed in FIGS. 1, 2 and 3, but rather the signals will spread to produce signal patterns something like those in FIG. 4. Even those signal patterns are oversimplified because reflections are not illustrated. FIG. 4 shows an example of a beam shape 24 of the transmitter at location A and the received beam shape 26 at the receiver at location D. Wall reflections are not shown.

Figure 5:
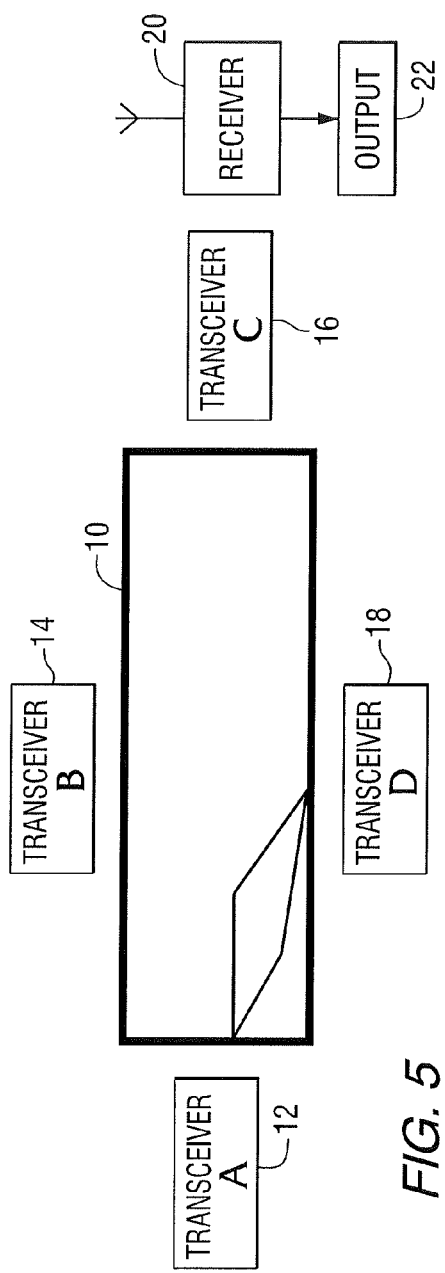

By processing the received signals, a map can be produced that shows a crude approximation of the interior. The net area of interrogation for the path between the transmitter at location A and the receiver at location D is approximately the region of intersection of the transmit and receive beams, as shown in FIG. 5. In other words, any obstruction in this area contributes to the attenuation of the received signal at D. Except for unwanted reflection effects, no data will be obtained from the regions that are not found in the intersection of receive and transmit beams. This is motivation to use more than 4 transceivers. The map resolution is increased if more transceivers are used. This may be accomplished, for example, by assembling groups of transceivers in a harness and stretching it along the building wall, or by moving some of the transceivers and taking more measurements from the new locations.

One method of creating the map or image of the building is to produce a transmission attenuation map, which is simply the multiplicative inverse of a transmission strength map. Objects or persons probably exist in paths where the transmission is most weak or zero. FIG. 5 shows a net area of interrogation due to the transmit and receive beam shapes. If the transmission between the transmitter at location A and the receiver at location D is weak in FIG. 5, then that coverage area is darkly shaded. A map can be produced by combining the shading diagrams between transmit/receive pairs.

Figure 6:
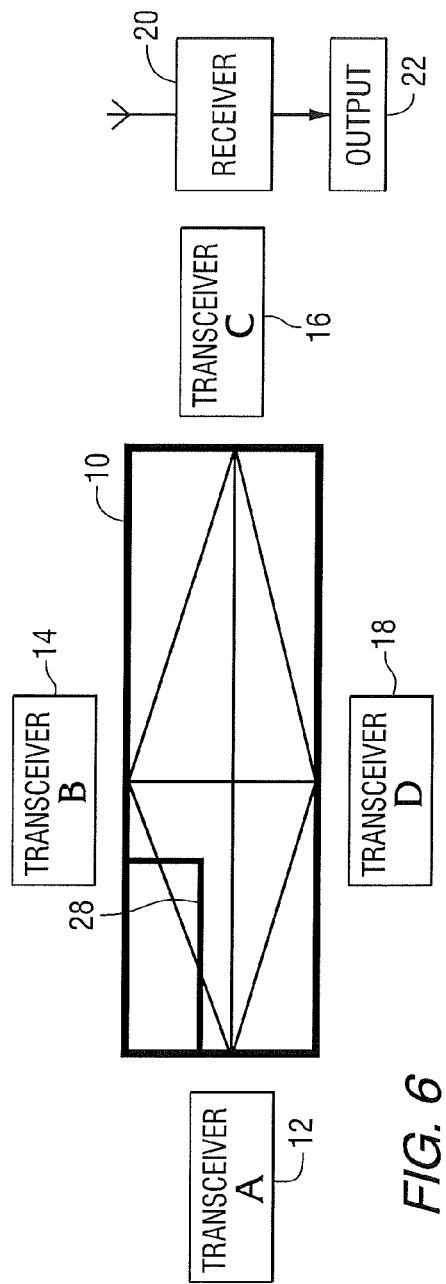

FIG. 6 illustrates a case with a building having a simple interior partition 28 (e.g. a closet). In this case, one would expect the signals between the transmitter at location A and the receiver at location B to be attenuated particularly with respect to the other paths, such as the path between a transmitter at location B and a receiver at location D. Without more receivers, one would not be able to deduce much more than the existence of a partition or some obstacle. A large pile of clothes might have the same effect as a partition. Nevertheless, this simple system provides evidence of an obstruction along the signal path. This is still useful information to the soldier or first responder who must enter the room and confront whatever happens to lie in his way.

The tomographic reconstruction produces a map of obstacles within the plane of the transceivers. So the transceivers should lie as close as possible within a single plane. Practically speaking, the plane is not infinitely thin, but depends upon the antennas and the electromagnetic scattering of the obstructions. This width has been estimated to be the order of a foot or so "thick" (in the vertical dimension) in empirical tests on very small buildings using Crossbow motes. Therefore if additional measurements are collected from transceivers located on horizontal "cutting" planes that are spaced about 1 foot apart (in the vertical dimension), a true 3D map of the building may be obtained. This type of collection is useful because it can distinguish between walls and other obstacles such as a pile of clothing. This is because walls typically traverse the entire distance between the floor and ceiling, whereas furniture and piled clothing or boxes, do not. The additional measurements may be collected with distinct sets of transceivers positioned in vertically displaced planes, or by elevating a single set of transceivers in vertical data-collection steps in order to collect measurements in multiple planes.

Prior knowledge of local construction practices, such as that assembled in the Army Corps of Engineers, Worldwide Construction Practices software, may be used to further refine the estimates of wall locations. For example if there is typically a single small and narrow bathroom in a residence, then this should guide the interpretation of the data. A Bayes estimation procedure could be used to incorporate prior knowledge of building practices in combination with a tomographic reconstruction. Local construction practices are in effect, a set of rules, or a type of "grammar" to the structure of a building. The use of a known type of grammar combined with tomographic data helps to estimate the layout of a building. Knowledge of what is typical construction should guide the (machine or human) interpretation of the transmission attenuation map or the tomographic map.

Additional prior knowledge is the location of external fixtures such as windows and doors. For example, it is highly probable that there is not an interior wall that prevents the exterior front door of a building from opening. In buildings that have not been remodeled, it is likely that interior walls do not divide windows. Some buildings have exterior marks (such as tie rods that reinforce the walls) that typically relate information about the likely locations of some interior walls. All of these observables are referred to as "exterior characteristics of the structure".

Figure 7:
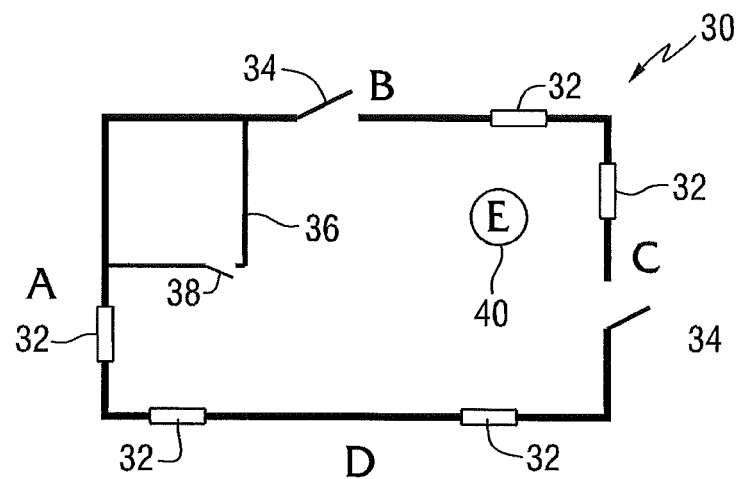
FIG. 7 is a schematic representation of a structure of interest.

FIGS. 7-10 illustrate how prior knowledge of building structure grammar can be used to influence the features of a structure map. FIG. 7 shows a true floor plan of a structure 30 including a plurality of exterior windows 32 and doors 34, and interior walls 36 with an interior door 38. Transceivers can be placed at locations A, B, C and D outside of the structure. In addition, in one embodiment, the invention can also utilize signals from a non-cooperative or cooperative transmitter 40 located at an unknown or known location within the structure of interest, such as a transceiver at location E.

Figure 8:
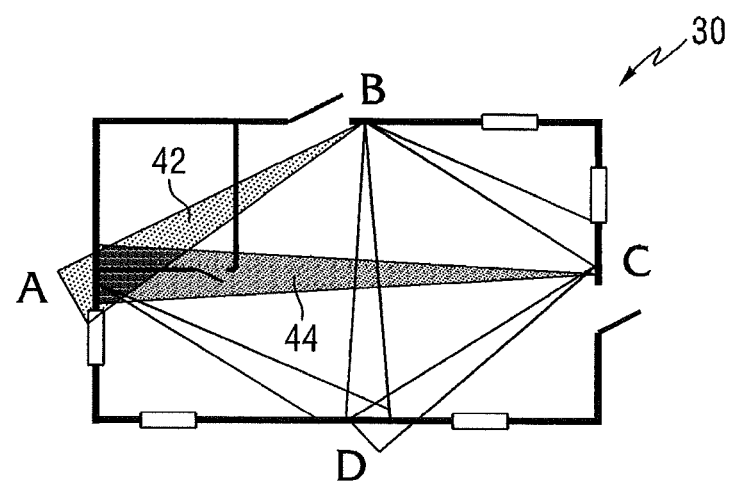
FIGS. 8 through 11 are schematic representations of systems that can be used to implement embodiments of the invention.
Figure 9:
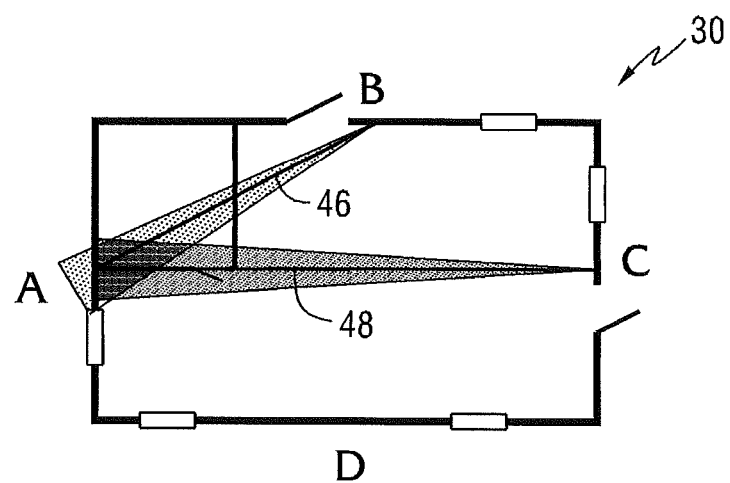
Figure 10:
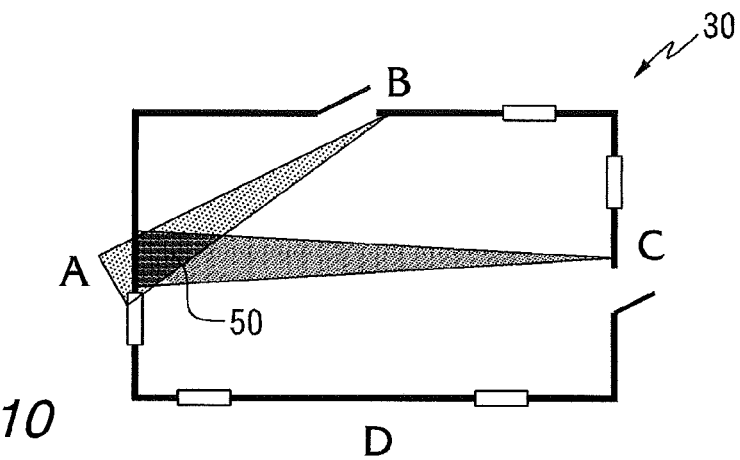

FIG. 8 is a signal attenuation diagram from four transceivers at locations A, B, C and D. Signals 42 and 44 that have been attenuated by obstructions in the structure are shown with darker shading. In FIG. 9, lines 46 and 48 estimate diagonal wall locations that are unguided by prior knowledge of typical construction practices (or conventional building "grammars"). In FIG. 10, line 50 represents a better way to estimate the location of an obstacle given knowledge of construction practices and the data. In FIG. 10, line 50 represents the estimate of a wall location and direction. The wall is estimated to be perpendicular because that is consistent with typical construction. The position of this line has been determined using both signal strength and the knowledge that typical construction practices utilize interior walls that are positioned perpendicular to outside walls. As illustrated in FIGS. 7-10 only limited knowledge of the structure interior can be learned using only four stationary transceivers.

Figure 11:
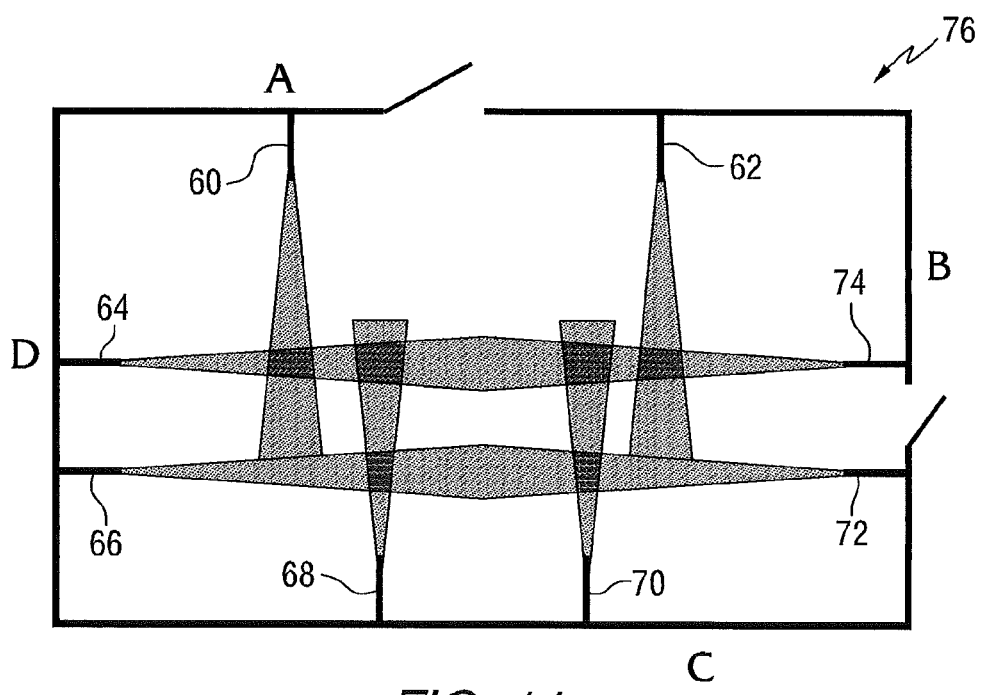

FIG. 11 is a simple probability model of the walls 60, 62, 64, 66, 68, 70, 72, and 74 of another structure of interest 76. The darker the shading in a location, the more probable that a wall is at that location. FIG. 11 shows how a simple probability model could be used to represent walls based upon the signal measurements. The probability of a wall is greatest where the shading in the transmission attenuation map or tomographic reconstruction is darkest. In one example, a hybrid graph-probability model can be used to estimate wall locations.

In another aspect, the invention can utilize transmitters that are located inside a structure. If the occupants of the building have installed a WiFi router such as the transceiver 40 in FIG. 7, its location is unknown, but it still may provide useful information. In this case, the occupants' WiFi router is located in the building and the receivers are located outside of the building. Using this type of passive arrangement, it is still possible to detect movement in the building and a general direction of the movement because the moving entity will block or disrupt the transmitted radiation.

An improvement of the systems described here can utilize WiFi transceivers with electronically steerable antennas. A system with steerable antennas will produce better images.

In another aspect, the invention can be used to detect the movement of persons in the building. For WiFi motion detection, the motion detection capability is due to the phenomena that when people move within the building, their bodies disturb the electromagnetic fields between a transmitter and a receiver. This phenomena may possibly be observed using nothing other than the occupants' own WiFi router (if they happen to have one) and a single receiver outside the building. However, the capability of detecting motion is increased if WiFi transceivers are scattered around the building as described above.

Once the transceivers are set up along the building, each signal does not normally vary much with time. When a person moves through a transmission path, such as the path between transceivers A and D (12 and 18) in FIG. 5, they cause a momentary and relatively large attenuation of the signal. The path of a person may be deduced from the temporal order of the transmitter/receiver paths that have momentary fluctuations.

In one embodiment, transceivers and processors (such as Zigbee radios or sensor motes) are used to exploit WiFi signals to map the interior of the building (WiFi mapping); and/or to detect movement of occupants (WiFi motion detection). Zigbee is a specification for a suite of high level communication protocols using small, low-power digital radios based on the IEEE 802.15.4-2003 standard for wireless personal area networks.

The invention can use WiFi signals of opportunity, or WiFi signals from transceivers placed outside the building. Using the system described above, it may be possible to detect motion and to produce crude maps of the interiors of simple buildings such as single family residences. This capability can be rapidly deployed by using commercial off-the-shelf sensor mote transceivers, such as the Crossbow IRIS Zigbee radios.

In one aspect, the invention produces an interior map of buildings and/or detects the motion of persons in the buildings that overcomes the limitations of the prior art in order to support first responders and urban warfare. In another aspect, the invention provides a method of producing an interior map of the structure including the steps of: placing a plurality of transceivers to transmit and/or receive signals that pass through at least a portion of a structure of interest, wherein each of the transceivers receives a signal from at least one of the other transceivers; and using the strength of the received signals and the locations of the transceivers to produce a map of the structure of interest and/or to detect movement of persons in the structure of interest. The method can use disturbances in electromagnetic fields to detect the movement of occupants within the structure (i.e., WiFi motion detection). In one embodiment, the method can estimate the number of moving occupants by detecting and localizing multiple electromagnetic field disturbances.

This invention can be implemented using commonly available parts to produce a see-through-the-walls capability. While the invention has been described in terms of several embodiments, it will be apparent to those skilled in the art that various changes can be made to the described embodiments without departing from the scope of the invention as set forth in the claims.

What is claimed is:

1. An apparatus comprising:
   a plurality of transceivers positioned outside of a building to transmit and receive signals that pass through at least a portion of the building, wherein each of the transceivers receives at least one of the signals that pass through at least a portion of the building from at least one of the other transceivers; and
   a processor using strength of the received signals, locations of the transceivers, prior knowledge of building practices, and exterior characteristics of the building to produce a map of an interior of the building, wherein the transceivers are positioned in vertically displaced planes and the processor produces maps of the interior of the building along the planes to produce a three-dimensional map of the interior of the building.

2. The apparatus of claim 1, wherein the transceivers include steerable antennas.

3. The apparatus of claim 1, wherein the transceivers are attached at intervals along a harness.

4. The apparatus of claim 1, wherein a set of the transceivers is elevated into the vertically displaced planes.

5. The apparatus of claim 1, wherein the map comprises a signal intensity map.

6. The apparatus of claim 1, wherein the map is produced using a tomographic back projection algorithm.

7. The apparatus of claim 1, further comprising a non-cooperative or cooperative transmitter located at an unknown or known location within the building, wherein the transceivers receive signals from the transmitter.

8. The apparatus of claim 7, wherein the transmitter located within the building is a router.

9. The apparatus of claim 1, wherein the map is produced using a Bayes estimation to incorporate prior knowledge of building practices and exterior characteristics of the building in combination with a tomographic reconstruction in order to improve the estimate of the map of the interior of the building.

10. A method comprising:
    placing a plurality of transceivers outside of a building to transmit and receive signals that pass through at least a portion of the building wherein each of the transceivers receives at least one of the signals that pass through at least a portion of the building from at least one of the other transceivers; and
    using the strength of the received signals, the locations of the transceivers, prior knowledge of building practices, and exterior characteristics of the building to produce a map of an interior of the building, wherein the transceivers are positioned in vertically displaced planes and the map is a three-dimensional map of the interior of the building.

11. The method of claim 10, wherein the transceivers include steerable antennas.

12. The method of claim 10, wherein the transceivers are attached at intervals along a harness.

13. The method of claim 10, wherein a set of the transceivers is elevated into the vertically displaced planes.

14. The method of claim 10, wherein the map comprises a signal intensity map.

15. The method of claim 10, wherein the map is produced using a tomographic back projection algorithm.

16. The method of claim 10, further comprising:
    using a non-cooperative or cooperative transmitter located at an unknown or known location within the building to transmit signals to the transceivers.

17. The method of claim 16, wherein the transmitter located within the building is a router.

* * * * *